(12) United States Patent
Paskalev et al.

(10) Patent No.: US 8,248,625 B2
(45) Date of Patent: *Aug. 21, 2012

(54) PREPARATION OF AGGREGATE JOBS FOR PRODUCTION

(75) Inventors: Boris I. Paskalev, Cambridge, MA (US); Henri B. Weinberg, Lexington, MA (US); Christian H. Hescock, Cambridge, MA (US); Jay T. Moody, Wayland, MA (US); Craig A. Fowler, Grosse Pointe Park, MI (US)

(73) Assignee: Vistaprint Technologies Limited, Hamilton (BM)

( * ) Notice: Subject to any disclaimer, the term of this patent is extended or adjusted under 35 U.S.C. 154(b) by 72 days.

This patent is subject to a terminal disclaimer.

(21) Appl. No.: 12/467,844

(22) Filed: May 18, 2009

(65) Prior Publication Data

US 2009/0219575 A1  Sep. 3, 2009

Related U.S. Application Data (62) Division of application No. 11/526,311, filed on Sep. 25, 2006, now Pat. No. 7,542,155.

(51) Int. Cl.
*G06F 3/12* (2006.01)
*G06K 15/00* (2006.01)
(52) U.S. Cl. ............... 358/1.13; 358/1.15; 358/1.16
(58) Field of Classification Search ............... 358/1.15, 358/1.16, 1.13; 399/82
See application file for complete search history.

(56) References Cited

U.S. PATENT DOCUMENTS

| | | |
|---|---|---|
| 4,918,588 A | 4/1990 | Barrett et al. |
| 5,272,549 A | 12/1993 | McDonald |
| 5,327,265 A | 7/1994 | McDonald |
| 5,483,653 A | 1/1996 | Furman |
| 5,539,865 A | 7/1996 | Gentile |
| 5,550,928 A | 8/1996 | Lu et al. |
| 5,748,963 A | 5/1998 | Orr .............................. 395/704 |
| 5,822,587 A | 10/1998 | McDonald et al. ........... 395/702 |
| 5,838,906 A | 11/1998 | Doyle et al. ............. 395/200.32 |
| 5,895,476 A | 4/1999 | Orr et al. ........................ 707/517 |
| 5,895,477 A | 4/1999 | Orr et al. ........................ 707/517 |
| 5,903,902 A | 5/1999 | Orr et al. ........................ 707/517 |

(Continued)

FOREIGN PATENT DOCUMENTS

DE 4121564 6/1990

(Continued)

OTHER PUBLICATIONS

U.S. Appl. No. 11/526,311, dated Sep. 25, 2006, Paskalev et al.

(Continued)

*Primary Examiner* — Satwant Singh
(74) *Attorney, Agent, or Firm* — Jessica J. Costa (57) ABSTRACT

System and method for automated scheduling and creation of gang shells specifying gangs of individual jobs for production to be created and produced in the future. Individual jobs and related production parameters and order information are retained electronically in a database of pending jobs awaiting production. Based on production capacity at the production facility and the production parameters of the individual pending jobs in the database, a plurality of gang shells having defined production parameters, but not having specific individual jobs associated therewith, are defined and used for scheduling equipment and personnel at the production facility during a work shift or other desired period of time. The specific individual jobs for a gang are selected from the database relatively shortly prior to the gang's scheduled production time.

39 Claims, 4 Drawing Sheets

U.S. PATENT DOCUMENTS

| | | | |
|---|---|---|---|
| 5,930,810 | A | 7/1999 | Farros et al. .................. 707/506 |
| 5,956,737 | A | 9/1999 | King et al. .................... 707/517 |
| 5,987,226 | A | 11/1999 | Ishikawa et al. |
| 6,161,114 | A | 12/2000 | King et al. .................... 707/517 |
| 6,535,294 | B1 | 3/2003 | Arledge, Jr. et al. |
| 6,650,433 | B1* | 11/2003 | Keane et al. .................. 358/1.15 |
| 6,839,149 | B2 | 1/2005 | Herr |
| 6,882,441 | B1 | 4/2005 | Faust et al. |
| 6,976,798 | B2* | 12/2005 | Keane et al. .................... 400/76 |
| 6,992,794 | B2 | 1/2006 | Keane et al. |
| 7,016,865 | B1 | 3/2006 | Weber et al. |
| 7,133,149 | B2* | 11/2006 | Keane et al. .................. 358/1.15 |
| 7,145,670 | B2* | 12/2006 | Keane et al. .................. 358/1.13 |
| 7,148,985 | B2 | 12/2006 | Christodoulou et al. |
| 7,187,465 | B2* | 3/2007 | Keane et al. .................. 358/1.15 |
| 7,216,092 | B1 | 5/2007 | Weber et al. |
| 7,298,516 | B2 | 11/2007 | Herr |
| 7,386,246 | B2 | 6/2008 | Yabe |
| 7,495,796 | B2 | 2/2009 | Keane et al. |
| 7,542,155 | B2* | 6/2009 | Paskalev et al. ............. 358/1.13 |
| 7,751,079 | B2* | 7/2010 | d'Entrecasteaux .......... 358/1.16 |
| 2003/0140315 | A1 | 7/2003 | Blumberg et al. |
| 2004/0006522 | A1 | 1/2004 | Keane et al. |
| 2006/0033958 | A1* | 2/2006 | d'Entrecasteaux .......... 358/1.16 |
| 2006/0253345 | A1 | 11/2006 | Heber |
| 2007/0070379 | A1 | 3/2007 | Rai et al. |
| 2008/0133500 | A1 | 6/2008 | Edwards et al. |
| 2009/0207447 | A1 | 8/2009 | Keane et al. |

FOREIGN PATENT DOCUMENTS

| | | |
|---|---|---|
| EP | 144138 | 6/1985 |
| EP | 0453802 | 10/1991 |
| EP | 0470266 | 2/1992 |
| EP | 0509333 | 10/1992 |
| EP | 1496448 A1 | 12/1998 |
| EP | 1040428 B1 | 11/2004 |
| EP | 1040428 B1 | 11/2004 |
| WO | 95/07507 | 3/1995 |

OTHER PUBLICATIONS

Nov. 14, 2007 VistaPrint's Responses to Defendants' First Set of Requests for Admissions to Plaintiff-Nos. 1-18, USDC D. Minn. C.A. No. 07-cv-2298-JNE-JJK *VistaPrint Technologies Limited* v. *123Print, Inc., et al.*

Jun. 30, 2008 VistaPrint's Responses to Defendants' Second Set of Requests for Admissions to Plaintiff-Nos. 19-55, USDC D. Minn. C.A. No. 07-cv-2298-JNE-JJK *VistaPrint Technologies Limited* v. *123Print, Inc., et al.*

CONF-AEO Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*

Exhibit 4: Website printout, Seybold Publications, "What has WYSIWYG done to us?" VP0007355-7372 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 5: A White Paper Prepared by CAP Ventures, SJ000001-0028 [to Deposition transcript of Steven T. Jecha dated Jan. 10, 2008, USDC D. Minn. C.A. No. 07-cv-2298-JNE-JJK VistaPrint Technologies *VistaPrint Technologies Limited* v. *123Print, Inc., et al.* ].

Exhibit 6: Article, "Who's the Boss" Oct 1998, SJ000048-0055 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 7: Article, "Online for success" Feb. 1999, SJ000030 to 0033 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 8: Article reprint, "iPrint Discount Printing Shop Awarded Twice During Internet Grand Opening," Jan. 17, 1997, ABC0011639-1640 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 9: Article reprint, "Self-Service Stationery," May 20, 1997, ABC0011706-1708 [to Deposition transcript of Steven T. Jecha dated Jan. 10, 2008, USDC D. Minn. C.A. No. 07-cv2298-JNE-JJK *VistaPrint Technologies Limited* v. *123Print, Inc., et al.*].

Exhibit 11: Article reprint, "It Takes A Cyber-Village, Tech Companies Find a Haven in St Paul's Lowertown," Nov. 24, 1997, ABC0017589-7593 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 12: Article reprint, "St Paul, Minn 119 Software Firm Aims for Error-Free Internet Printing Jobs." Jan. 3, 1998, ABC0017594-7595 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 13: Article reprint, iPrint Raises 1st Round Funding to Innovate $20 Billion Commercial Printing Market; Online Print Shop Environment to Revolutionize Commercial Printing, Nov. 10, 1997, ABC0011674 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 14: Article reprint, "Deluxe Launches World's Easiest Business Cards Limited Edition New Free Software Download Lets Computer Users Try Before They Buy," Nov. 14, 1996, ABC0011594 to 1595 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 15: Article, "Proposing a Standard Web API," Feb. 1996, ABC0011748 to 1754 [to Deposition transcript of Steven T. Jecha dated Jan. 10, 2008, USDC D. Minn. C.A. No. 07-cv2298-JNE-JJK *VistaPrint Technologies Limited* v. *123Print, Inc., et al.*].

Exhibit 16: Website printout, iPrint.com, Sep. 15, 2000, ABC0011976 to 1984 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 17: Website printout, Insty-Prints BizCards Online, Sep. 14, 2000, ABC0011985 to 1990 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 18: Website printout, Insty-Prints, Sep. 14, 2000, ABC0011991 to 1999 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 20: Steve Jecha/Winfield Mitchell Privileged Document Log, 1 pg. [to Deposition transcript of Steven T. Jecha dated Jan. 10, 2008, USDC D. Minn. C.A. No. 07-CV-2298-JNE-JJK *VistaPrint Technologies Limited* v. *123Print, Inc., et al.*].

Exhibit 21: Steve Jecha Privileged Document Log, 1 pg. [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 33: Article, "Essential Gear for Prepress Success '98," May 1998, SJ000044 to 0045 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 34: Website printout, Minnesota Secretary of State, DigitalNet, Inc., VP0013393 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 35: Group exhibit, JM000001 to 0116 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 36: Group exhibit, folder labeled "Completed Biz-Cards," SJ000809 to 0833 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 37: Group exhibit, folder labeled "BANC—General Info," SJ000834 to 0920 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 38: Group exhibit, folder labeled "Bizcards Online," SJ000921 to 1003 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 39: e-mail string, Jecha to Arledge, Dec. 18, 1997, w/ attachment, SJ000589, 0599 to 0600, 0603 to 0604, 0601 to 0602 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 49: Publication, "The Future of Digital Printing is Powered by Virtual Pre-Press," SJ000162 to 0178 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 50: Group exhibit, "VPP In-a-Box Prospect Letters," SJ000243 to 0259 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 51: Business Plan, Digital-Net, Inc., SJ000185 to 0214 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 55: File Wrapper and Contents, European Patent Office File Wrapper, ABC0012610 to 13431 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

CONF-AEO Deposition transcript of Winfield A. Mitchell dated Jan. 11, 2008, USDC D. Minn. C.A. No. 07-cv-2298-JNE-JJK *VistaPrint Technologies Limited* v. *123Print, Inc., et al.*

Exhibit 58: European Patent Specification, EP 1 040 428 B1, ABC0012577 to 2609 [to Deposition transcript of Winfield A. Mitchell dated Jan. 11, 2008, USDC D. Minn. C.A. No. 07-cv-2298-JNE-JJK *VistaPrint Technologies Limited* v. *123Print, Inc., et al.*].

Exhibit 59: Article "Print Merge" Red Herring, Spring, 1997, 5 pgs. [to Deposition transcript of Winfield A. Mitchell dated Jan. 11, 2008, USDC D. Minn. C.A. No. 07-cv-2298-JNE-JJK *VistaPrint Technologies Limited* v. *123Print, Inc., et al.*].

Exhibit 75: Subpoena in a Civil Case, Dan Gribsby, with attachments, 8 pgs. [to Deposition transcript of Daniel C. Grigsby dated Mar. 11, 2008, USDC D. Minn. C.A. No. 07-cv-2298-JNE-JJK *VistaPrint Technologies Limited* v. *123Print, Inc., et al.*].

Deposition transcript of Neil Mix dated Apr. 24, 2008, USDC D. Minn. C.A. No. 07-cv-2298-JNE-JJK *VistaPrint Technologies Limited* v. *123Print, Inc., et al.*

Exhibit 102: Defendants' Notice of Taking Deposition of Neil Mix [to Deposition transcript of Neil Mix dated Apr. 24, 2008, USDC D. Minn. C.A. No. 07-cv-2298-JNE-JJK *VistaPrint Technologies Limited* v. *123Print, Inc., et al.*].

Feb. 04, 2008 DI59 Defendants' Memorandum in Support of Their Motion to Amend Their Answer to Allege Inequitable Conduct and Unclean Hands, USDC D. Minn. C.A. No. 07-cv-2298-JNE-JJK *VistaPrint Technologies Limited* v. *123Print, Inc., et al.*

Mar. 12, 2008 DI70 First Amended Answer and Counterclaims of 123Print, Inc.; Drawing Board (US), Inc. (d/b/a Stationery House, Inc.); and Taylor Strategic Accounts, Inc. to Plaintiff's Second Amended Complaint, USDC D. Minn. C.A. No. 07-cv-2298-JNE-JJK *VistaPrint Technologies Limited* v. *123Print, Inc., et al.*

Jun. 30, 2008 Defendants' Answers to Plaintiff's Third Set of Interrogatories (Nos. 10-17), USDC D. Minn. C.A. No. 07-cv-2298-JNE-JJK *VistaPrint Technologies Limited* v. *123Print, Inc., et al.*

Defendants' Amended Prior Art Statement dated Jun. 16, 2008, USDC D. Minn. C.A. No. 07-cv2298-JNE-JJK *VistaPrint Technologies Limited* v. *123Print, Inc., et al.*

Preliminary Invalidity Claim Chart for U.S. Pat. No. 6,247,011—Amaya Editor/Browser dated Jun. 16, 2008.

Welcome to Amaya. W3C, 2007 [retrieved 2007] Amaya Editor/Browser Retrieved from the Internet: <URL: www.w3.org> ABC0016203 to ABC0016424.

Preliminary Invalidity Claim Chart for U.S. Pat. No. 6,247,011—BizCards dated Jun. 16, 2008.

Conf-About Digital-Net, Inc., undated VP0000163 to 165.

Insty-Prints BizCards Online [online]. [Retrieved on 2000-09-14]. Retrieved from the Internet: 21 URL: https://www.banc.com/instyprints/>. [Bates Nos. ABC0011985-11999.

Preliminary Invalidity Claim Chart for U.S. Pat. No. 6,247,011 & One or More of the Design Intelligence, Inc. Patents (ABC0017059-17490) dated Jun. 16, 2008.

Preliminary Invalidity Claim Chart for U.S. Pat. No. 6,247,011 & Doyle 2/96 Article Entitled "Proposing a Standard Web API" (ABC11748-754) dated Jun. 13, 2008.

Doyle, M., Ang, C. And Martin, D. *Proposing a Standard Web API*, Dr. Dobb's Journal (Feb. 1996) pp. 18-26 ABC11748-11754.

Preliminary Invalidity Claim Chart for U.S. Pat. No. 6,247,011 & Doyle's U.S. Patent 5,838,906 (ABC 11320-339) dated Jun. 13, 2008.

Preliminary Invalidity Claim Chart for U.S. Pat. No. 6,247,011 U.S. Patent 5,930,810 issued to Farros et al. (Farros '810 Patent) (ABC0011474-494) dated Jun. 13, 2008.

Preliminary Invalidity Claim Chart for U.S. Pat. No. 6,247,011—iPRINT dated Jun. 13, 2008.

'iPrint Discount Printing Shop Awarded Twice During Internet Grand Opening' dated Jan. 17, 1997, pp. 11-12, PR Newswire Association, Inc. ABC0011639-11640.

'Talk City Welcomes eCommerce to its Internet Community; Launches New Online Shopping Area with FAO Schwarz, Amazon.com, CyberShop, eToys, iPrint, First Auction, ISN's Computer Superstore, Worldview Systems and Talk City's own Company Store' dated Dec. 9, 1997, pp. 4-6, Pr Newswire Association, Inc. ABC0011666-11668.

'commerceNet Names iPrint Electronic Commerce Winner; VIP (very Innovative Practice) Award Given to Online Print Shop,' dated Nov. 12, 1997, p. 9, PR Newswire Association, Inc. ABC0011671.

'iPrint Announces Presonalized Holiday Cards; Now You Can Design and Order Professionally Printed Holiday Cards Directly Online', dated Oct. 27, 1997, pp. 13-14, PR Newswire Association, Inc. ABC0011675-11676.

'Prodigy Partners with iPrint; Internet Discount Stationery Leader iPrint to Provide Online Design and Printing Services for Prodigy Members' dated Sep. 30, 1997, pp. 15-16, PR Newswire Association, Inc. ABC0011677-11678.

'Internet Discount Stationery Leader iPrint to Offer Online Design and Printing Services via Apple Small Business Website,' dated Sep. 17, 1997, pp. 17-18, PR Newswire Association, Inc. ABC0011679-11680.

'EarthLink Network to Offer Electronic Shopping With Top Retail Brands,' dated Sep. 9, 1997, pp. 19-20, PR Newswire Association, Inc. ABC0011681-11682.

'iPrint Qualifies for Excite Certified Merchant Program Internet Discount Stationery Leader iPrint Participates in Launch,' dated Sep. 4, 1997, pp. 21-22, PR Newswire Association, Inc. ABC0011683-11684.

'CSi CompuServe Partners with iPrint; Internet Discount Stationery Leader iPrint to Provide Online Design and Printing Services for CSi Members', dated Sep. 3, 2997, pp. 23-24, PR Newswire Association, Inc. ABC0011685-11686.

'Teneron.com and iPrint, Inc. Announce Strategic Partnership Agreement' dated Aug. 15, 1997, pp. 25-26, PR Newswire Association, Inc. ABC0011687-11688.

'iPrint Honored for Business Excellence on the Web by IDG's WebMaster Magazine' dated Aug. 15, 1997, pp. 27-28, PR Newswire Association, Inc. ABC0011689-11690.

Post-Newsweek Business Information, Inc. Newsbytes. Online Printing Company Introduces Cyberstationary. Moffett Field, California, USA, Jul. 30, 1997 [online] [retrieved on Jul. 9, 1997]. ABC0011691-11692.

PR Newswire Association, Inc. Financial News. Internet Stationery Leader iPrint Helps San Francisco Bay Area Business Cope With the Costs of Area Code Changes; iPrint Discount Print Shop Provides Online Design and Printing Services. Nasa Ames Research Center, Moffett Field, Calif. Jul. 30, 1997 [online] [retrieved on Jul. 31, 1997] ABC0011693.

'iPrint Introduces CyberStationery; iBizCards, iAnnounce, & iInvites Are First Online Versions of Printed Stationery', dated Jul. 29, 1997, pp. 32-33, PR Newswire Association, Inc. ABC0011694-11695.

'Fee Me', dated Jul. 17, 1997, p. 34, PR Newswire Association, Inc. ABC0011696.

'iPrint, Internet Shopping Network Partner; iPrint to Provide Online Design and Printing for ISN,' dated Jul. 15, 1997, pp. 35-36, PR Newswire Association, Inc. ABC0011697-11698.
'iPrint Partners with Onvillage; iPrint to Provide Online Design and Printing for Onvillage Yellow pages Customers,' dated Jul. 1, 1997, p. 37, PR Newswire Association, Inc. ABC0011699.
'iPrint Offers Online Discount Printing via Fourll; iPrint Extends Popular Online Design and Printing Service to fourll.com,' dated Jun. 23, 1997, p. 38, PR Newswire Association, Inc. ABC0011700.
'iPrint joins PointCast Connections Superchannel; iPrint Develops Premier Printing Channel on the Internet,' dated Jun. 17, 1997, pp. 39-40, PR Newswire Association, Inc. ABC0011701-11702.
'iPrint and onQ Announce Partnership; Internet Discount Stationery Leader iPrint to Provide Online Design and Printing for onQ Gay Forum Members,' dated Jun. 16, 1997, p. 41, PR Newswire Association, Inc. ABC0011703.
'InfoSpace Partners With iPrint; Internet Discount Stationery Leader iPrint to Provide Online Design and Printing for InfoSpace Customers,' dated Jun. 16, 1997, p. 42, PR Newswire Association, Inc. ABC0011704.
'iPrint Adds Labels, New Graphics to Internet Print Shop,' dated Jun. 12, 1997, p. 43, PR Newswire Association, Inc. ABC0011705.
'Self-Service Stationery,' dated May 20, 1997, pp. 44-46, Pr Newswire Association, Inc. ABC0011706-11708.
'Internet Stationery Leader iPrint, Inc. Announces Rubber Stamps and Server Clustering,' dated May 13, 1997, p. 47, PR Newswire Association, Inc. ABC0011709.
'Taking Printing to the 'Net; Offers printing services over the Internet,' dated May 1997, pp. 48-49, PR Newswire Association, Inc. ABC0011710-11711.
'Internet Stationery Leader iPring Helps Seattle Business Cope With the Costs of Area Code Changes; iPrint Discount Print Shop Provides Online Design and Printing Services at up to 70% Off of Traditional Commercial Print Costs,' dated Apr. 30, 1997, p. 50, PR Newswire Association, Inc. ABC0011712.
'Internet Stationery Leader iPrint Partners with Fourll's RocketMail; iPrint Internet Discount Print Shop to Provide Online Design and Printing Services for RocketMail Customers in a Co-label Agreement,' dated Apr. 24, 1997, pp. 51-52, PR Newswire Association, Inc. ABC0011713-11714.
'iPrint Lets You Design Your Own Money on the Internet and Save Big $'s,' dated Apr. 1, 1997, p. 53, PR Newswire Association, Inc. ABC0011715.
'Internet Business Card Leader iPrint, Inc. Announces Letterhead and Envelopes Extensions; Now You can Design and Order Discount Envelopes, Letterhead, Even Import Your Company's Logo,' dated Mar. 7, 1997, pp. 54-55, PR Newswire Association, Inc. ABC0011716-11717.
'Shop Lets Customers Be Designers, Via Browser,' dated Feb. 17, 1997, pp. 56-57, PR Newswire Association, Inc. ABC0077718-11719.
'iPrint, the Internet discount printing shop of the future provides commercial thermography using the BCT system,' dated Jan. 31, 1997, pp. 58-59, PR Newswire Association, Inc. ABC0011720-11721.
'BCT announces a strategic agreement with iPrint, the Internet discount printing shop,' dated Jan. 30, 1997, p. 60, PR Newswire Association, Inc. ABC001 1722.
'iPrint Discount Printing Shop Awarded Twice During Internet Grand Opening,' dated Jan. 17, 1997, pp. 61-62, PR Newswire Association, Inc. ABC0011723-11724.
'Printer Utilities: Page Formatting Programs,' dated May 11, 1987, pp. 63-67, PR Newswire Association, Inc. ABC0011725-11729.
'Indigo Software Ltd. Has unveiled 1print, a forms and graphics generation program for laser printers. Lprint is said to allow the use of an IBM Personal Computer to draw forms and graphics interactively on the screen using a mouse or a cursor and function keys and to save the results as an electronic form) 1print supports printers from Hewlett-Packard Col, Canon, Inc., IBM and Ncr Corp. It costs $259. Indigo Software, 1568 Carling Ave., Ottawa, Ont., Canada K1Z 7M5,' dated Mar. 3, 1986, p. 68, New Products; Microcomputers; Software utilities; P. 78 Computerworld, Inc. ABC0011730.

'SPA Names iPrint a Finalist for Prestigious SPA Codie Award; iPrint Professional Print Shop Sets New Standard for Interactive E-Commerce,' dated Dec. 16, 1997, p. 1, PR Newswire Association, Inc. ABC0011731.
'iPrint Announces Personalized Holiday Cards; Now You can Design and Order Professionally Printed Holiday Cards Directly Online,' dated Oct. 27, 1997, pp. 2-3, PR Newswire Association, Inc. ABC0011732-11733.
'Internet Stationery Leader iPrint Helps San Francisco Bay Area Business Cope With the Costs of Area Code Changes; iPrint Discount Print Shop Provides Online Design and Printing Services,' dated Jul. 30, 1997, p. 4, PR Newswire Association, Inc. ABC0011734.
'iPrint Introduces CyberStationery; iBizCards, iAnnounce, & iInvites Are First Online Versions of Printed Stationery,' dated Jul. 29, 1997, pp. 5-6, PR Newswire Association, Inc. ABC0011735- 11736.
'Fee Me,' dated Jul. 17, 1997, p. 7, PR Newswire Association, Inc. ABC0011737.
'iPrint Offers Online Discount Printing via Fourll; iPrint Extends Popular Online Design and Printing Service to Fourll.com,' dated Jun. 23, 1997, p. 8, PR Newswire Association, Inc. ABC0011738.
'iPrint joins PointCast Connections Superchannel; iPrint Develops Premier Printing Channel on the Internet,' dated Jun. 17, 1997, pp. 9-10, Pr Newswire Association, Inc. ABC0011739-11740.
'iPrint and onQ Announce Partnership; Internet Discount Stationery Leader iPrint to Provide Online Design and Printing for onQ Gay Forum Members,' dated Jun. 16, 1997, p. 11, Pr Newswire Association, Inc. ABC0011741.
'Internet Stationery Leader iPrint Helps Seattle Business Cope With the Costs of Area Code Changes; iPrint Discount Print Shop Provides Online Design and Printing Services at up to 70% Off of Traditional Commercial Print Costs,' dated Apr. 30, 1997, p. 12, Pr Newswire Association, Inc. ABC0011742.
'iPrint Lets You Design Your Own Money on the Internet and Save Big $'s,' dated Apr. 1, 1997, p. 13, Pr Newswire Association, Inc. ABC0011743.
'Internet Business Card Leader iPrint, Inc. Announces Letterhead and Envelopes Extensions; Now You Can Design and Order Discount Envelopes, Letterhead, Even Import Your Company's Logo,' dated Mar. 7, 1997, pp. 14-15, Pr Newswire Association, Inc. ABC0011744-11745.
'iPrint Discount Printing Shop Awarded Twice During Internet Grand Opening,' dated Jan. 17, 1997, pp. 16-17, Pr Newswire Association, Inc. ABC0011746-11747.
File History for U.S. Patent 6,247,011 ABC0011755-11768.
Burke, Jonathan. 'Print Merge iPrint wants to become the front end for the entire business forms printing market'. The Red Herring, 1997 [online]. Retreived from http://www.redherring.com/hits/03/meree.html. ABC0011971-11984.
Edwards, S., Kingsley, L., Votsch, V., Walter, M. 'Roll over, Gutenberg: how the Web is changing printing,' Seybold Report on Internet Publishing, v2, n1, p5(16) Sep, 1997 VP0006144-6162.
Cone Uspto U.S. Appl. No. 08/982,438, Amendment and Examiner Interview Summary, dated Sep. 19, 2000 VP0010767-10785.
Preliminary Invalidity Claim Chart for U.S. Pat. No. 6,247,011 —Java in a Nutshell dated Jun. 13, 2008 'Java in a Nutshell' is a book published before the priority date of the patents-in-suit. "Java in a Nutshell: a Desktop Quick Reference for Java Programmers" by David Flanagan (O'Reilly & Associates, Inc., 1996).
Preliminary Invalidity Claim Chart for U.S. Pat. No. 6,247,011 — PRINTOVATIONTm dated Jun. 13, 2008.
'Printovation, Vision/Scope Document' dated Feb. 23, 1998 ABC0002175-2180.
'Printovation, Functional Requirements' dated Feb. 23, 1998 ABC0002181-2205.
'Printovation—Internet Bound Vision/Scope Document' dated Nov. 12, 1997 ABC0002223- 2227.
Printovation Business Profile dated Feb. 1997 ABC0007434-7478.
Preliminary Invalidity Claim Chart for U.S. Pat. No. 6,247,011 — WebEdit dated Jun. 13, 2008.
CD containing native file Nesbitt Software WebEdit ABC0016903.
Email from <Newshirt@best.com> to nesbitt.com dated Mar. 3, 1996 ABC0016184-16186.

Website <www.nesbitt.com> dated Feb. 17, 1997 ABC0017563-17580.
Preliminary Invalidity Claim Chart for U.S. Pat. No. 6,247,011 & Webwriter (ABC0016045-16077) dated Jun. 13, 2008.
Agenda May 7-9, 1996, Fifth International World Wide Web Conference May 6-10, 1996, Paris, France ABC0016045-16056.
Crespo, A. And Bier, E.A., 'WebWriter: A Browser-Based Editor for Constructing Web Applications,' Fifth International World Wide Web Conference May 6-10, 1996, Paris, France ABC0016057-16077.
Preliminary Invalidity Claim Chart for U.S. Pat. No. 6,247,011 — World's Easiest dated Jun. 13, 2008.
'World's Easiest' information sheet ABC0001753.
'Print Now or Print Professionally' Technology Profile dated Feb. 1997 ABC0001757-1799.
Krishna, B.C. '1996, Gutenberg, and the Revenge of Movable Type' dated Oct. 18, 2007 <www.w3.org>ABC11576-11584.
'World's Easiest; Deluxe's World's Easiest Business Essentials Dtp software; Software Review; Brief Article; Evaluation' dated May, 1997, pp. 3-4, Copyright 1997 Information Access Company, A Thompson Corporation Company; ASAP Copyright 1997 Ziff-Davis Publishing Company PC/Computing ABC0011585-11586.
'Marketing Mix: The castaway client' dated Feb. 6, 1997, p. 5, Copyright 1997 Haymarket Publishing Services Ltd. Marketing ABC0011587.
'Risky business; Deluxe Corp's World's Easiest Business Essentials business printing software; Software Review; Brief Article; Evaluation' dated Feb. 1997, p. 6, Copyright 1997 Information Access Company, A Thompson Corporation Company; ASAP Copyright 1997 Ziff-Davis Publishing Company Windows Sources ABC0011588.
'Risky business; Deluxe Corp's World's Easiest Business Essentials business printing software; Software Review; Brief Article Evaluation' dated Feb. 1997, p. 7, Copyright 1997 Information Access Company, A Thompson Corporation Company; ASAP Copyright 1997 Ziff-Davis Publishing Company Windows Sources ABC0011589.
'World's Easiest Software for OS/2 Warp Ships Today As Part of Deluxe Corporation and IBM Joint Marketing Agreement' dated Dec. 6, 1996, pp. 8-9, Copyright 1996 PR Newswire Association, Inc. PR Newswire ABC0011590-11591.
World's Easiest Offers Free Holiday Ink Stamp Software on the Internet; Custom Address Stamps Add a Festive Touch to Holiday Greetings' dated Nov. 27, 1996, pp. 10-11, Copyright 1996 PR Newswire Association, Inc. PR Newswire ABC0011592-11593.
'Deluxe Launches World's Easiest Business Cards Limited Edition New Free Software Download Lets Computer Users Try Before They Buy,' dated Nov. 14, 1996, pp. 12-13, Copyright 1996 PR Newswire Association, Inc. PR Newswire ABC0011594-11595.
'Deluxe Launches Improved World's Easiest On-Line Printing Service; New Software and Services Provide the Easiest Way Yet to 'Print Now or Print Professionally dated Sep. 25, 1996, pp. 14-15 Copyright 1996 PR Newswire Association, Inc. PR Newswire ABC0011596-11597.
'Deluxe Software Licensed' dated Jun. 13, 1996, p. 16 Copyright 1996 Saint Paul Pioneer Press All Rights Reserved Saint Paul Pioneer Press (Minnesota) ABC0011598.
'Deluxe Corporation Enters Licensing Agreement With IBM IBM Licenses World's Easiest Software for the Aptiva Personal Computer' dated Jun. 12, 1996, pp. 17-18 Copyright 1996 PR Newswire Association, Inc. PR Newswire ABC0011599-11600.
'Deluxe Corporation and IBM Announce World's Easiest Software for OS/2 Warp Environment' dated Apr. 17, 1996, p. 19, Copyright 1996 PR Newswire Association, Inc. PR Newswire ABC0011601.
'World's Easiest Announcements lives up to its name; T/Maker's World's Easiest Announcements announcement design software; Software Review; Evaluation; Brief Article' dated Apr. 1996, pp. 20-21, Copyright 1996 Information Access Company, A Thompson Corporation Company; Asap Copyright 1996 Ziff Davis Publishing Company Computer Shopper ABC0011602-11603.
'High Tech Holiday Gifts' dated Dec. 2, 1995, pp. 22-23, Copyright 1995 Cable News Network, Inc. ABC0011604-11605.

'For the World's Easiest Personal Image Bundle, A cliché rings true; T/Maker Co; Software Review; Brief Article; Evaluation' dated Dec., 1995, pp. 24-25, Copyright 1995 Information Access Company, a Thompson Corporation Company; ASAP Copyright 1995 Ziff Davis Publishing Company Computer Shopper ABC0011606-11607.
'Business Image Bundle; T/Maker Co's World's Easiest Business Image Bundle Beginning business graphics software; Windows 95 Buyers Guide; Software Review; Brief Article; Evaluation' dated Dec. 1995, pp. 26-27, Copyright 1995 Information Access Company, a Thompson Corporation Company; ASAP Copyright 1995 Ziff Davis Publishing Company PC/Computing ABC0011608-609.
'Runners Rack Up Mileage' dated Sep. 15, 1995, pp. 28-29, Copyright 1995 The Roanoke Times (Virginia) ABC0011610-11611.
'T/Maker Introduces World'S Easiest Software Line; Deluxe subsidiary's software makes creating customized products as easy to use as a push-button appliance' dated Aug. 28, 1995, pp. 30-31, Copyright 1995 PR Newswire Association, Inc. ABC0011612-11613.
'Apple Delivers Next Generation of Portable Performance With New Powerpc Processor-Based Macintosh Powerbook 5300; PowerBook 5300 Models Lead Industry in Price/Performance' dated Aug. 28, 1995 Copyright 1995 PR Newswire Association, Inc. ABC0011614-11617.
'T/Maker Introduces World's Easiest Software Line; A Brand New Line of Software that Makes Creating Customized Products as Easy as Using a Push-Button Appliance' dated Aug. 25, 1995, pp. 36-37 Copyright 1995 Business Wire, Inc. ABC0011618-11619.
'World's Easiest Software Offers Simple Graphics Design' dated Aug. 24, 1995, pp. 38-39 Copyright 1995 Post-Newsweek Business Information Inc. Newsbytes ABC0011620-11621.
'T/Maker Introduces World'S Easiest Software Line; A Brand New Line of Software That Makes Creating Customized Products As Easy to Use As a Push-Button Appliance' dated Aug. 18, 1995, pp. 40-42 Copyright 1995 Pr Newswire Association, Inc. ABC0011622-11624.
'Activesystems Announces World'S Easiest-To-Use Document Storage and Retrieval Product for Client/Server Environments' dated Mar. 24, 1994, pp. 43-44 Copyright 1994 Canada NewsWire Ltd. ABC0011625-11626.
'Activesystems Announces World'S Easiest-To-Use Document Storage and Retrieval Product for Client/Server Environments' dated Mar. 24, 1994, pp. 45-46 Copyright 1994 PR Newswire Association, Inc. ABC0011627-11628.
Preliminary Invalidity Claim Chart for U.S. Pat. No. 6,247,011— Applix Anywhere dated Jun. 13, 2008.
Sommergut, W., 'Competing Approaches, Office Solutions for the Slim Client' dated Nov. 1997, Heft 5, ABC0037761-37773.
Bericht, Cw, Sommergut, W., 'Widerstreitende Ansatze Office-Losungen far den schlanken Client' dated Nov. 1997, Heft 5, VP0015588-15598.
'Applix announces Applix Anywhere Office, the most complete Java-based desktop environment for the Sun JavaStation' dated Oct. 29, 1996 <www.thefreelibrary.com> ABC0037982-37987.
'Applix demos one of the first enterprise-aware Sun Microsystems Java web application; World Wide Web becomes transport for new kind of client/server deployment—simplified access to enterprise data for decision support any time, anywhere in the world' dated Nov. 8, 1995 <www.thefreelibrary.com> ABC0037988-37993.
'Anyware Demo' dated 1997 <www.applix.com> ABC0037994-38017.
'Applix helps you to stay ahead of your changing world' dated 1997 <www.applix.com> ABC0038018-38019.
'Applix Anyware' dated 1998 <www.applix.com> ABC0038020-38023.
Applix WebWord demo. Retrieved from Internet: <http://web.archive.org/web/19980429184900/www.applix.com/anyware/demo/webword.gif> ABC0038024-38025.
'Commission File No. 0-25040 Applix, Inc.' U.S. Securities and Exchange Commission Form 10-K/A dated Dec. 31, 2000 ABC0038057-38076.
'Commission File No. 0-25040 Applix, Inc.' U.S. Securities and Exchange Commission Amendment No. 1 to Form 10 K/A dated Dec. 31, 2000 ABC0038077-38161.

'Applix sells off Vistasource, Applixware Office, Anywhere Office, and Cosource' dated May 15, 2001 <www.linuxtoday.com> ABC0038162-38178.
Preliminary Invalidity Claim Chart for U.S. Pat. No. 6,247,011 — Corel Office for Java dated Jun. 13, 2008.
Both, D. 'OS/2 Warp' <www.os2bbs.com>.Millennium Technology ABC0037827-37838.
'IBM OS/2 Warp 4 screen shots' <toastytechcom> undated ABC0037839-37858.
'OS/2', Wikipedia, undated <en.wikipedia.org> ABC0037859-37879.
'Corel Office—Java Version Beta 1' dated Apr. 16, 1998 <www.somis.dundee.ac.uk> ABC0037880-37898.
'Corel Office fuer Os/2 Warp 4' dated Sep. 25, 1996 <groups.google.com/group/maus.os.os2.talk ABC0037899 'Core! Office for Java Certified 100% Pure Java' dated May 1, 1997, 2008 Novell, Inc., ABC0037900-37901.
'Corel Office for Javee Certified 100% Pure Java' dated May 1, 1997, 2008 Novell, Inc., ABC0097900-37901.
'Somis—University of Dundee—Downloadable Goods' Apr. 16, 1998 <www.somis.dundee.ac.uk/pub/downs/goods.htm> ABC0037902-37905.
'Welcome of Corel Office for Java' dated Nov. 19, 1996 <officeforjava.corel.com> ABC0037906-37930.
'WordPerfect for IBM Personal Computers' Version 5.0 WordPerfect Corporation 1989, ABC0037931-37934.
'WordPerfect Suite 8 User's Guide' Corel Corporation Limited, 1997, ABC0037935-37981.
CD containing Corel Office for Java Version 1.0, © Corel Corporation Limited, 1997 ABC0038310.
Preliminary Invalidity Claim Chart for U.S. Pat. No. 6,247,011— SCITEX dated Jun. 13, 2008.
Seybold Special Report 'SSF '95, Part I, Electronic Delivery, High-Res Output, Short-Run Printing' © 1995 Business Wire, © 1994 Gale Group VP0015949-15952.
European Patent Office, Decision revoking the European Patent EP 1040428B1, Jun. 25, 2009, Germany, pp. 49.
Pages from the Corel Office for Java website retrieved from archive.org and accompanying affidavit, dated Nov. 19, 1996 and Jan. 13, 1997 and archived Dec. 19, 1996 and Feb. 10, 1997.
Sommergut, Wolfgang Office Solutions for the Slim Client, Mar. 1997, Germany, along with original foreign language version.
Brors, Dieter, Internet-Office: Office Packages Increasingly Application Servers, May 1997, Germany, along with original foreign language version.
Michel, Dieter, Applix Anyware and Corel Office for Java: Thick and Thin, Jul. 1997, Germany, along with original foreign language version.
Seybold Special Report, Electricity Delivery, High-Res Output, Short-Run Printing, Sep. 26, 1995 and Oct. 23, 1995, San Francisco, CA.
Amended Joint Claim Construction Statement, *Vistaprint Technologies Ltd.* v. *123Print Inc.,* Drawing Board (US) Inc. (d/b/a Stationery House Inc.), and Taylor Strategic Accounts, Inc., CA 0702298 (JNE/JJK) (D. Minn), dated Jul. 1, 2008.
Autodesk internet release#11, published Oct. 1990.
Back, "Heisser Kaffee," C't magazine, No. 2, pp. 138-142 (1996).
Collection of articles on desk top publishing, C't magazine, pp. 218-245 (1996).
Collection of articles published in "Digital Design" magazine, pp. 86-91 (Mar. 25, 1986).
*Colorquick LLC* v. *Vistaprint Ltd.,* Case No. 6:09-cv-323-LED (E.D. Tex.), Expert Report of David L. Zwang regarding the invalidity of U.S. Patent No. 6,839,149.
*Colorquick LLC* v. *Vistaprint Ltd.,* Case No. 6:09-cv-323-LED (E.D. Tex.), Expert Report of Ping Wah Wong rebutting Dr. David L. Zwang's report regarding the invalidity of U.S. Patent No. 6,839,149.
*Colorquick LLC* v. *Vistaprint Ltd.,* Case No. 6:09-cv-323-LED (E.D. Tex.), Technology Tutorial of Defendants Vistaprint Ltd. And Officemax Inc.
Huskes, "Netz der Mythen," C't magazine, No. 12, pp. 250-256 (1996).
Microstation Cad software manual, version 5, published Mar. 1994.
Nullity suit writ dated Jun. 7, 2007 against EP 0852359 (English translation provided).
Opi, Open Prepress Interface Specification 1.3, Aldus Corp., Sep. 22, 1993.
Patent Owner's response to appeal of nullity suit EP 0852359 determination dated Jul. 9, 2007 (English translation).
"Pira/PPITB Developments in Printing Technology 1982 Update of Ten Years Forecast," pp. xii-xv (1982).
"Reif fur die 'use'," Chip magazine, No. 3, pp. 221-214 (Mar. 1996).
Request dated Jul. 21, 2009 to dismiss appeal of decision of Second Division of German Federal Patent Court dated Nov. 13, 2009 relating to EP 0852359.
Schreiber et al., "Image processing in the cognitive information processing group research laboratory of electronics," MIT (Oct. 1979).
Sehon, "There's still a lot of ink and water Demand Business, pp. 46-49 (Dec., in electronic publishing," published in Print on 1996) brought against EP 0852359 (English translation).
Supplement dated Nov. 5, 2007 to Nullity suit brought against EP 0852359 (English translation).
Sorgaard, Pal and Sandahl Tone Irene, "Problems with Styles in Word Processing: a Weak Foundation for Electronic Publishing with Sgml", 1997.
File Wrapper of U.S. Patent No. 6,976,798.
File Wrapper of U.S. Patent No. 7,145,670.
File Wrapper of U.S. Patent No. 7,133,149.
File Wrapper of U.S. Appl. No. 10/608,981.
File Wrapper of U.S. Patent No. 7,495,796.
File Wrapper of U.S. Patent No. 6,650,433.
File Wrapper of U.S. Patent No. 6,992,794.
File Wrapper of U.S. Appl. No. 12/391,019.
File Wrapper of U.S. Patent No. 7,187,465.
U.S. Appl. No. 6,247,011.
U.S. Appl. No. 6,631,375.
U.S. Appl. No. 7,120,634.
U.S. Appl. No. 11/543,372.
U.S. Appl. No. 7,542,155.
U.S. Appl. No. 12/467,844.
U.S. Appl. No. 11/648,990.
U.S. Appl. No. 90/009,295.
U.S. Appl. No. 90/009,296.
U.S. Appl. No. 90/009,287.
Appeal of Nullity Suit brought against European Patent EP 0 852 359 B1 (Jan. 21, 2009).
European Patent No. 1040428B1.
European Patent Publication No. EP1496448.

* cited by examiner

PREPARATION OF AGGREGATE JOBS FOR PRODUCTION

REFERENCE TO PRIOR APPLICATION

This application is a divisional of prior application Ser. No. 11/526,311 filed on Sep. 25, 2006, which is hereby incorporated by reference in its entirety.

FIELD OF THE INVENTION

This invention relates to the printing or other manufacturing of electronic files.

BACKGROUND OF THE INVENTION

Printing services Web sites allowing a user to access the site from the user's home or work and design custom products for personal or commercial use are well known and widely used by many consumers, professionals, and businesses. For example, through the site VistaPrint.com, VistaPrint Limited markets a variety of printed products, such as business cards, postcards, brochures, holiday cards, letterhead, announcements, invitations and the like. Typically, printing services sites allow the user to select a customizable design template prepared by the services provider and use online tools provided by the site to incorporate the user's personal information and content into the template to create a custom product design. When the design is completed to the user's satisfaction, the user can place an order through the site for production and delivery of a desired quantity of the corresponding printed product. When an order is placed, the user's electronic document design and related printing parameters, such as indicators of the quantity to be produced, the type of paper stock to be used, and the required delivery date to the user, are stored electronically in a database of pending print jobs for use by the printing services provider in scheduling and producing the printed product.

For a printing services provider engaged in printing large numbers of relatively short run individual orders for personalized products, it is advantageous to assemble many of the individual print jobs into a larger aggregate print job or "gang" having similar print requirements, e.g., paper stock, quantity to be produced, required post-printing processing, and whether the product is to be printed in color on both sides or only one. The ganging of many individual print jobs into a single aggregate print job file allows many individual products to be printed simultaneously on relatively large sheets of paper or other material using large format printing presses. After printing, the printed sheets are cut to separate the various individual printed products for subsequent packaging and shipment to the individual customers. U.S. Pat. No. 6,650,433 entitled "Managing Print Jobs", the entire disclosure of which is hereby incorporated by reference, discloses a system for the creation and printing of aggregate print job files comprised of a number of individual print jobs In the past, the gangs to be printed during a given production period were typically all created well in advance of the time of actual printing. For example, once per day, usually at some point during the preceding night, the service provider would execute a ganging program to search a database of pending print jobs and generate the gangs to be produced during the next business day or possibly later.

The creation of production gangs well before the time of actual production has several drawbacks. For example, the circumstances existing at the time of gang creation may have significantly changed before the gang can be produced. For example, one or more documents in a gang may have been modified or cancelled after gang creation. In this situation, to avoid disrupting the production schedule of all of the other documents in the gang, the printing services provider will typically choose to proceed with the printing of the gang and then discard those modified or cancelled documents, resulting in wasted materials and a lost opportunity to print another document in that gang position. Also, after the gangs are generated, there may be an unexpected equipment malfunction or unexpected staffing issues, such as illness or inclement weather that unexpectedly prevented some production personnel from being at work. Further, because a printing services Web site is constantly available to its customers, new product production requests are being received from customers 24 hours a day. High priority or rush printing requests may be received by the site shortly after the daily gang creation process was completed, resulting in a day's delay before the associated print job can be incorporated into a gang at the next scheduled gang creation time. As yet another drawback, if a product in a gang becomes damaged during processing or for another reason requires reprinting, a day's delay will typically be encountered before that product is incorporated into another gang. The delaying of production of a product by even one day may cause the printing services provider to incur increased shipping charges by requiring the provider to employ a more expensive expedited shipping means to get the product to the customer by the promised delivery date. In some cases, the delay may result in the product not reaching the customer by the delivery date, leading to customer dissatisfaction, refunds and, potentially, the loss of future business.

The above described drawbacks in the prior art are not limited to the printing of gangs of documents, but apply also to any type of manufacturing or processing involving the automated ganging or aggregation of multiple individual electronic job files for convenience or efficiency of production, such as multiple individual job files ganged together for etching, embossing, engraving, or other types of processing.

There is, therefore, a need for automated systems and methods that both (a) provide advance gang scheduling to advise production facility personnel of the type of production tasks and materials required during one or more upcoming work shifts and (b) provide increased flexibility to handle and adapt to high priority orders and unexpected problems by delaying the final creation of production gangs until shortly before the production process

SUMMARY

The present invention is directed at satisfying the need for automated systems and methods for scheduling and creating gangs of multiple individual jobs for production.

In accordance with one embodiment of the invention, the printing parameters associated with pending individual print jobs are searched to define a plurality of gang shells representing gangs planned to be subsequently created and printed. Based on the gang shells and the printing capacity at the printing facility, a schedule for the printing of at least some of the gangs represented by the gang shells is developed. The gangs to be printed are not created until shortly before the gang's scheduled print time.

It is an object of the invention to permit a planning schedule for a work day, work shift or other desired time period to be developed for the equipment and personnel at the manufacturing facility while also permitting the selection of the specific individual jobs to be placed in each gang to be deferred until closer to the scheduled time for production of that gang.

It is an advantage of the invention that production facility personnel can review gang schedule information in advance regarding the type and quantity of products to be produced while the production gangs to be produced are created based on newer information about available pending individual jobs than was available at the time the gang shell schedule was developed.

These and other objects, features and advantages of the invention will be better understood with reference to the accompanying drawings, description and claims.

DETAILED DESCRIPTION

Figure 1:
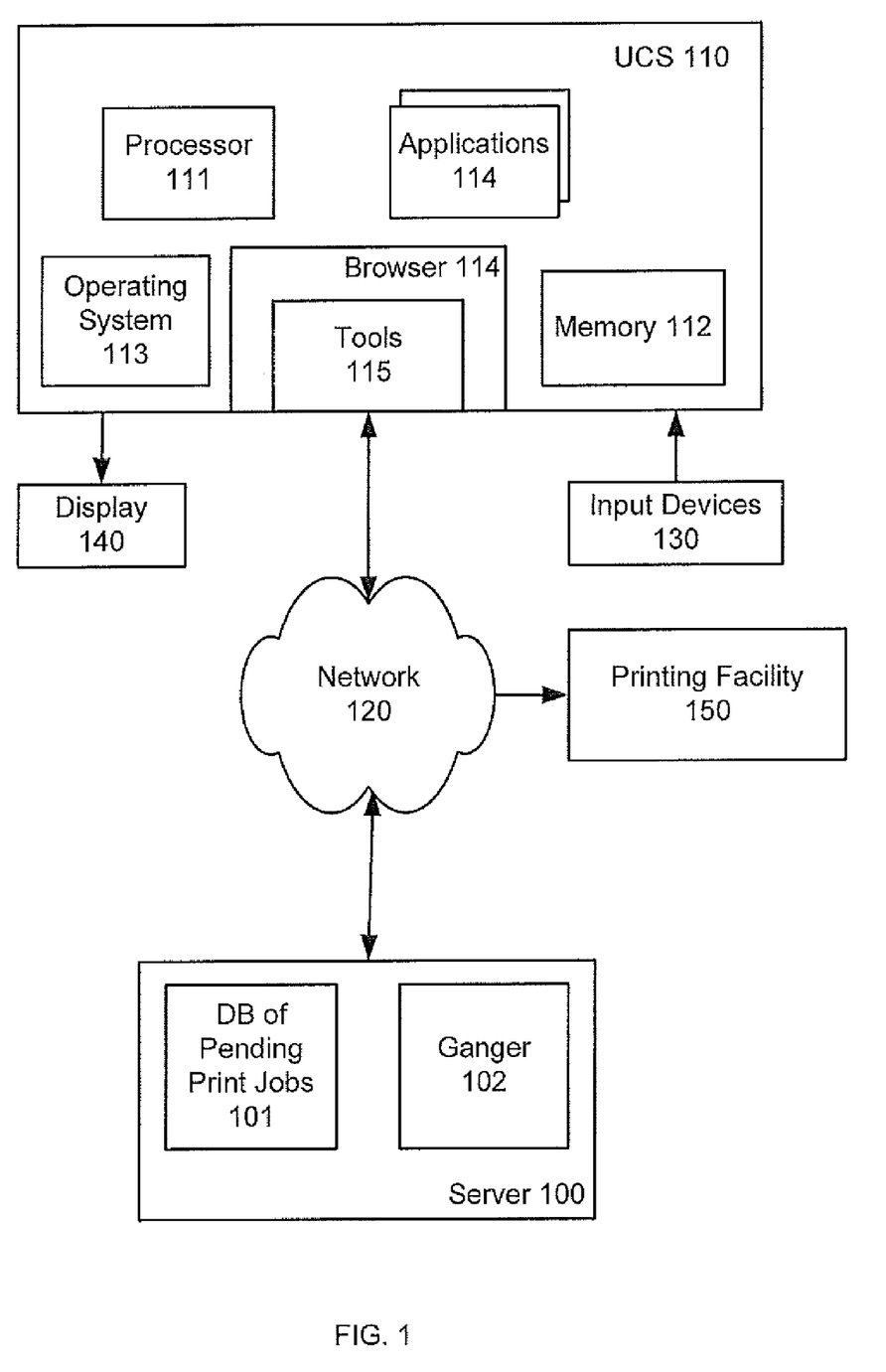
FIG. 1 shows an illustrative system with which the invention may be employed.

FIG. 1 depicts an illustrative environment in which the invention may be employed. Server 100, operated by a printing services provider, maintains pending print job database 101, which includes the electronic descriptions of pending individual print jobs that are awaiting printing. As used herein in describing the embodiment below, the term "individual print job" refers to an individual document design for which an order has been received to print and deliver according to user-selected parameters, including a selected quantity and delivery speed. For example, a request to print a quantity of 250 of a business card design for delivery in 14 days would be an individual print job. The term "aggregate print job" refers herein to a larger print file containing a plurality of different individual print jobs that will be printed simultaneously. More broadly, the term "individual job" encompasses both individual print jobs and other individual production jobs files to be produced by other manufacturing or processing methods, such as etching, engraving, and so forth. Similarly, "aggregate job" broadly encompasses any aggregation of individual electronic job files for simultaneous processing or manufacturing. Aggregate jobs are also referred to herein as "gangs" and the process of selecting and organizing a plurality of individual jobs into a gang is referred to as "ganging".

UCS 100 is a typically equipped personal computer running Web browser program 114 such as Internet Explorer from Microsoft Corporation and having a processor 111, an operating system 113 such as a version of the Windows operating system from Microsoft Corporation, a display device 140 such an a CRT or LCD display, input devices 130 such as a keyboard and a mouse, and components and subsystems such as RAM, ROM, and internal and external hard drives, indicated collectively as memory 112. UCS 110 may also be executing one or more application programs 114, such as word processing or graphics design programs. UCS 110 could alternatively be any other device suitable for providing a document to server 100 in electronic form for printing, such as a portable computer, a tablet computer, or a computer system adapted or provided for electronic product ordering, such as a product kiosk, workstation or terminal.

In the depicted embodiment of a Web-based electronic product design system, tools 115 represents product design and ordering programs and tools downloaded to UCS 110 via network 120 from server 100, such as downloadable product design and ordering tools provided by VistaPrint Limited and publicly available at VistaPrint.com. Tools 115 runs in browser 114 and exchanges information and instructions with server 100 during a design session to support the user's preparation of a customized product. When the customer is satisfied with the design of the product, the design can be uploaded to server 100 for storage and subsequent production of the desired quantity of the physical product on appropriate printing and post-print processing systems at printing facility 150. It will be appreciated that an individual print job could alternatively have been generated by another program, such as one of the applications 114, or could have been obtained by UCS 100 from another source.

While a single printing facility 150 is depicted in FIG. 1, it will be understood that a service provider with customers located around the world could advantageously employ multiple printing facilities in different geographical locations. FIG. 1 depicts an embodiment wherein server 100 and printing facility 150 communicate via network 120, such as the World Wide Web. It will be understood that other physical configurations and communications techniques could be employed. For example, server 100 could be located at printing facility 150 such that communications between the server 100 and the computer systems at the printing facility could occur over a local area network or intranet or by other electronic or manual techniques. While server 100 is shown in FIG. 1 as a single block, it will be understood that server 100 could be multiple servers and associated data storage components and subsystems configured to communicate and operate cooperatively to support the Web site operations. Server 100 may be interacting with many user computer systems, such as UCS 100, simultaneously.

Pending print job database 101 at server 100, which could be designed and implemented as multiple separate databases storing different types of individual print job information, contains the electronic product descriptions of pending individual print jobs and various information and status indications associated with each print job. A large Web-based printing services provider may routinely print hundreds of gangs per day containing thousands of different individual print jobs. For this type of volume printing operation, at any given moment database 101 will typically contain many thousands, or possibly tens of thousands, of pending print jobs awaiting ganging and production.

Associated with each pending print job are indications of the product type, the paper stock to be used, the quantity ordered, the customer's account information, delivery date and address, production status, and the like. In the disclosed embodiment, database 101 also includes a cross reference to other products, if any, that were part of the same order and are to be provided to the customer as a single shipment.

As will be discussed in more detail below, ganger 102 is a program executing on server 100 for searching the pending individual print jobs in database 101 and selecting individual print jobs for ganging. In the embodiment disclosed herein, ganger 102 has multiple modes of operation. Ganger 102 could, if desired, be implemented as separate programs or functions.

When operated in a first mode, ganger 102 creates a plurality of "gang shells", which are high-level descriptions of production gangs to be created and produced in the future. Each gang shell defines the general characteristics of a gang, such as the production priority, the paper stock, and the production quantity, but does not contain any specific individual print jobs. In the first mode of operation, ganger 102 also creates a proposed production schedule based on the gang shells and the type, number, and theoretical capacities of the printing systems available at facility 150 and provides the schedule to server 410 as preview schedule 411 for review by the production staff at the printing facility. In the disclosed embodiment, ganger 102 typically generates and schedules gang shells once every 24 hours before the start of a production period, but it will be understood that this operation could be performed more or less frequently, as desired by the printing services provider. As discussed below, ganger 102 may also perform this function one or more times during the production period in reaction to updates from personnel or equipment at the printing facility that require revision of the production schedule.

When operated in a second mode, Ganger 102 creates production gangs corresponding to the gang shells, each production gang having specific individual print jobs assigned to individual positions in the gang. As will be discussed below, production gangs are generally created on an "as needed basis" such that production gangs are created from time to time during the production period.

Figure 2:
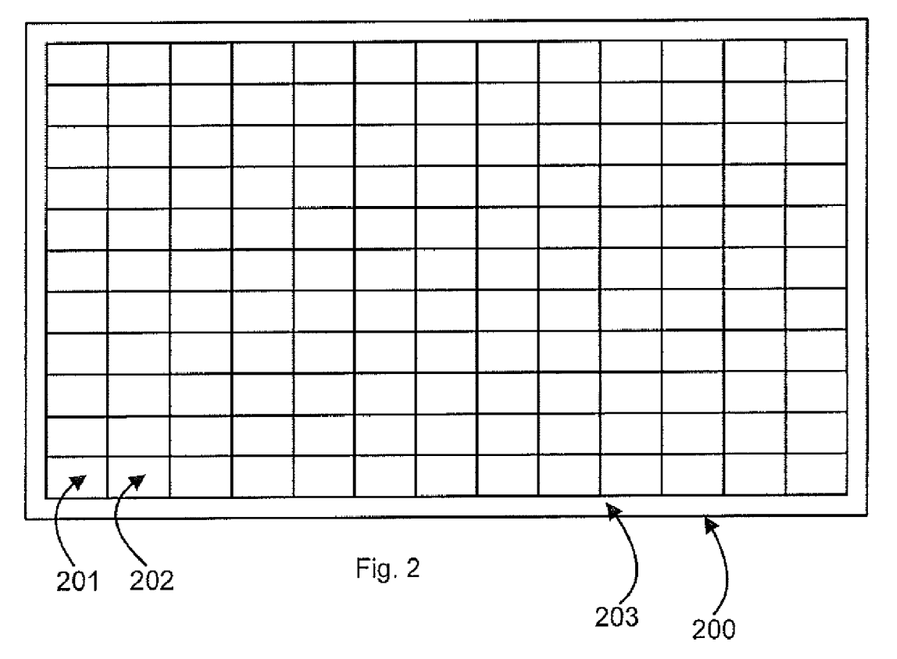
FIGS. 2 and 3 show illustrative examples of aggregate print jobs.

The assembling of many individual print jobs into an aggregate print job for the purpose of simultaneous printing allows the material and production costs associated with using large format printing systems to be shared among all the jobs in the gang, making the share of the production cost for each individual job relatively small. FIG. 2 illustrates gang 200 for the simultaneous printing of many business cards print jobs, each business card being approximately 2 inches by 3.5 inches, on a large format press, for example on a sheet having dimensions of 1.0 meter by 0.6 meter. In this example, gang 200 is an 11 by 13 grid containing individual positions for 143 different individual business card print jobs. In other words, position 201 could be the business card design for customer A, position 202 the business card design for customer B, and so forth. With this gang, 143 separate business card print jobs for 143 different customers can be simultaneously created by assembling the electronic business card files into a single large electronic gang file, printing a desired quantity of copies of the gang file, and cutting the stack of printed gang sheets to separate the printed stack into separate sets of business cards for individual packaging and shipping to the 143 different customers. Gang identifiers, registration marks, date of production, and other information desired by the printing services provider for internal processing and gang tracking can be printed in the available margin area 203.

Figure 3:
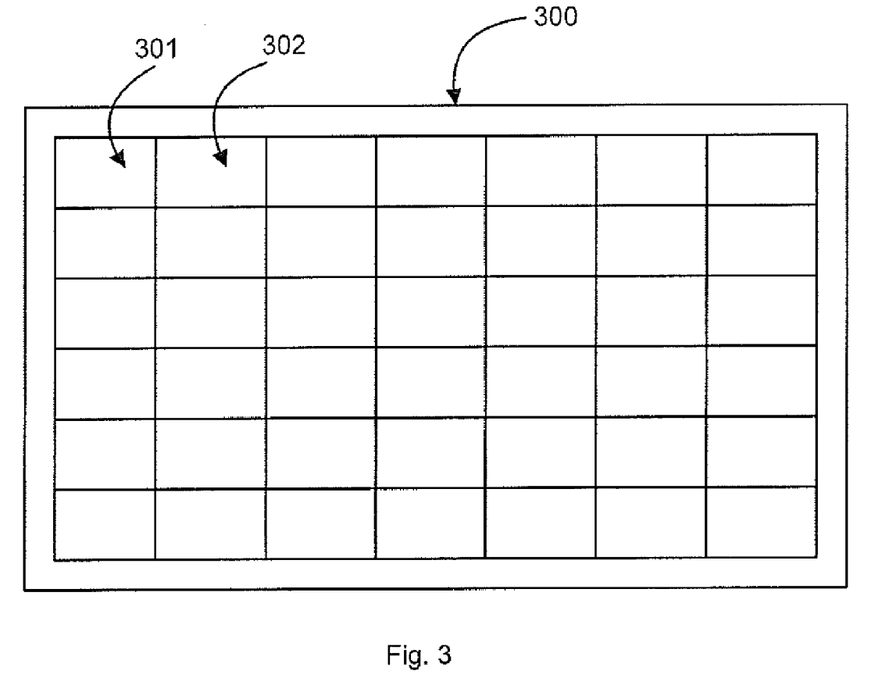

The number of different print jobs that can be accommodated in a single gang will, of course, vary by the dimensions of the particular product. FIG. 3, as another example, illustrates gang 300 for the simultaneous printing of 42 postcards on a sheet of paper similar in size to that discussed above in connection with FIG. 2. In a typical gang, position 301 would contain the postcard design of customer X, position 302 the postcard design of customer Y, and so forth. While gangs comprised of print jobs for the same type of product, such as shown in FIGS. 2 and 3, typically fit on the paper in the most efficient manner with the least wasted space, it will be understood that gangs could be created having two or more different sizes of products in a single gang. For example, a gang layout having both business card positions and postcard positions could be employed, if desired by the printing services provider.

Figure 4:
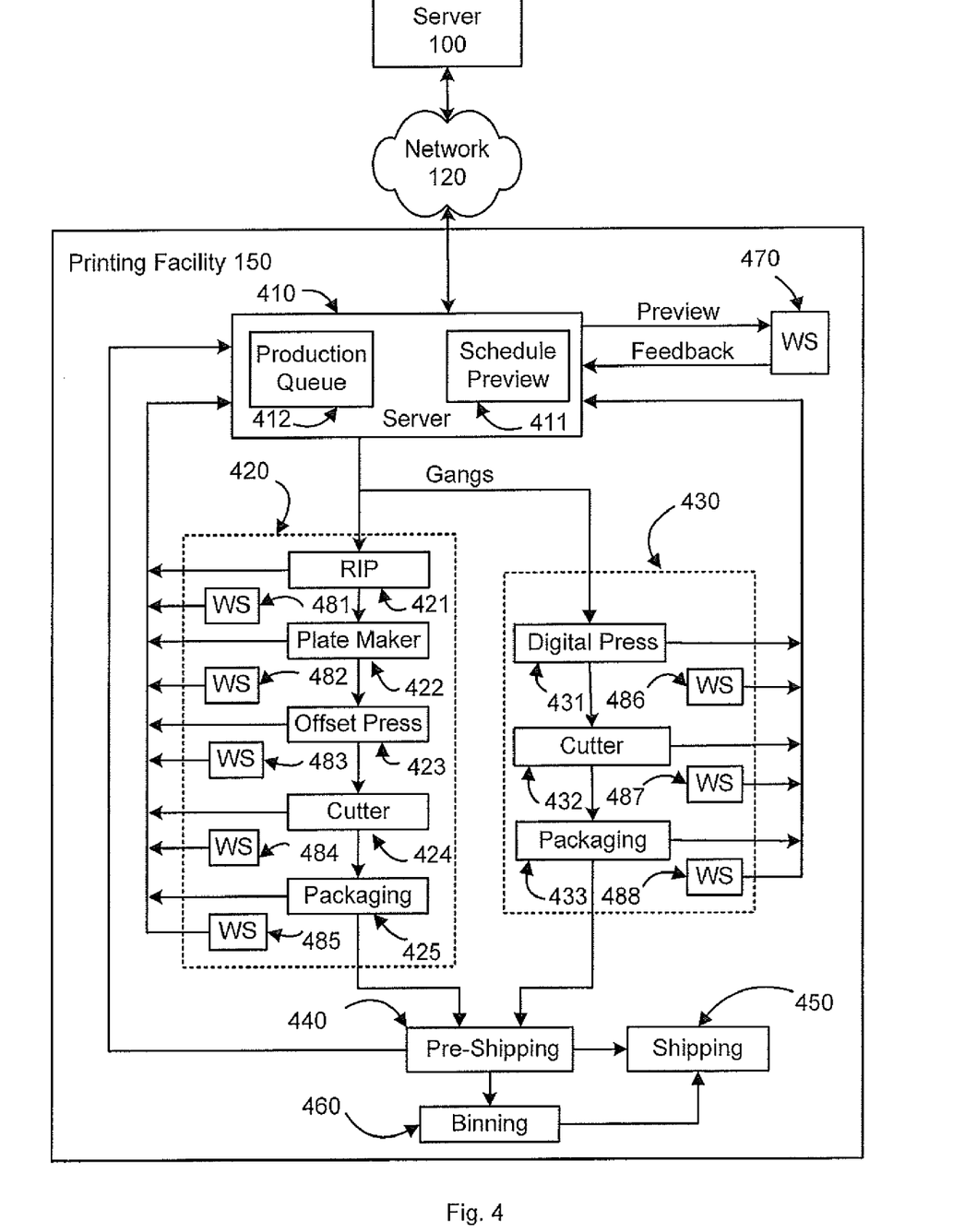
FIG. 4 illustrates the flow of print jobs through a representative printing facility.

FIG. 4 is a representative printing facility 150. In the illustrated embodiment, a single offset press line 420 and a single digital press line 430 are shown for simplicity of presentation, but it will be understood that a large scale printer offering a range of different products would typically have multiple offset press lines and multiple digital press lines in operation in facility 150. Also, it will be understood that the printing services provider could configure the system elements of the printing facility in various other ways if desired. For example, a single plate maker could supply plates for multiple offset presses, a single cutter could handle the cutting operations for multiple presses, a single packaging station could handle the packaging for the output from multiple cutters, and so forth. In addition, as mentioned above, it will be appreciated that the invention is not limited to processing involving the printing of ink on paper, but can be usefully employed in any type of manufacturing process involving the ganging or aggregation of multiple individual production jobs for simultaneous production, such as multiple jobs ganged together for etching, embossing, engraving, or other forms of processing.

At facility 150, the production gang files created at server 100 are initially retained in production queue 410 at printing facility 150. Some production gangs will be created for and supplied to offset press lines while other gangs will be created for and supplied to digital press lines. An offset press has a relatively greater setup cost than a digital press, but has a lower per copy cost for print jobs printed at higher quantities. Server 100 will, therefore, typically assign individual print jobs to an offset or digital production gang primarily on the basis of the quantity to be produced. For example, products ordered in lower quantities such as 10 or 20 would typically be more produced on a digital press while products ordered at larger quantities such as 250 or more would typically be produced on an offset press.

The offset line 420 includes a raster image processor (RIP) 421 for receiving the electronic gang file to be printed in electronic form, for example in PDF format, and converting the received PDF file into four CMYK color-separated electronic files. The files from the RIP are supplied to plate maker 422, which creates the corresponding metal plates for use in offset press 423. RIP 421 and plate maker 422 can be implemented as separate systems or a plate maker having integrated RIP capability can be employed. The plates are then supplied to an offset printing press capable of printing large paper stock, for example a 41-inch Roland 700 press from Man Roland. If the product is to be printing in color on both sides, a total of eight plates (four for each side) are required. Additional processing plates and processes, such as scoring of the sheets or the application of foil, may also be involved for some products. After printing, the stack of printed sheets is supplied to cutter 424, which cuts the sheets along the perimeters of the individual print jobs to separate the individual stacks of printed products, which can then be individually packaged at packaging 425 for mailing to the customer.

In the digital print line 430, the electronic gang file is supplied to digital press 431, for example an Indigo digital press from Hewlett-Packard. Digital press 431 performs the required RIP processing and prints the gang file on the desired quantity of sheets. The printed gang sheets are then processed by cutter 432 to separate the individual print jobs, which are packaged at packaging station 433.

It will be understood that additional equipment, not shown, could also be employed depending on the particular types of products offered by the printing services provider. For example, if the printing services provider offers products such as brochures, presentation folders, or envelopes, various additional post-printing processing steps, such as folding, gluing, or additional trimming, could be performed before the product is ready for packaging.

Facility 150 uses a centralized shipping function for packaged products from both the offset press lines and the digital press lines. After packaging, all products are processed at pre-shipping 440 to determine whether the product is to be shipped by itself or is to be shipped in combination with one or more additional products. If a single product was ordered, the packaged product is forwarded directly to shipping 450 for release to a carrier or delivery service to initiate the delivery to the customer's home or office. If multiple products were ordered, these items may be produced on different equipment and, in that situation, different component parts of the order will generally arrive at pre-shipping 440 processing at different times. If the printing services provider desires to ship the entire order at one time, the other item or items in the order that arrive first are placed in a physical holding bin at binning 460 until all items are ready to be shipped. When the final item in the order arrives, all items in the order are packaged for shipment and forwarded to shipping 450.

It is desirable that production of the different products in a single order be coordinated such that all products are produced as close to the same time as is reasonably feasible. Coordination of product production times reduces the average amount of time that products must spend in the bins. This minimizes the amount of floor space that must be devoted to the binning area and, therefore, reduces the physical area that must be covered by the binning staff in the binning and retrieval process. As individual products in a multi-product order are detected at pre-shipping 440, for example by scanning a bar code on the product package or other tracking technique, the status of the associated unprinted pending print jobs in database 101 is updated to indicate that a portion of the order is waiting in binning 460. In the disclosed embodiment, this status increases the priority of all associated unprinted print jobs.

While some or all of the manufacturing systems 421-425 and 431-433 at the printing facility may have the capability to automatically monitor their operation and provide status and fault information to server 100 for use by ganger 102, the staff at the printing facility may have additional information that is not immediately or readily accessible to ganger 102. For example, the printing facility staff may be aware of information such as equipment problems not automatically reported or an unexpected shortage of skilled operators. The production staff is therefore given an opportunity to review a proposed schedule, represented as preview schedule 411, and provide feedback In FIG. 4, workstation WS 470 is depicted for this purpose, but the production staff could access preview schedule 411 from another workstation on the production floor, such as WS 481-488, or possibly from a personal computer, not shown, having access to server 410 from elsewhere in the facility. Preview schedule 411 contains only gang shells for schedule planning purposes. No specific individual print jobs are associated with these gang shells. Only later when actual production gangs are created will the specific individual print jobs be assigned.

The type of feedback solicited or accepted from the production staff is a design decision by the printing services provider. For example, in a system that relies on manual scheduling by the production staff at the printing facility, the staff could be presented with a list of gangs to be produced and be allowed to control the production sequence of individual gangs and the distribution of gangs among the available presses. In a more automated system with less manual control, the assignment of gangs to presses and the sequence of gang production and printing during the day could be controlled by ganger 102 with feedback from the production personnel being limited to specific inputs such as updates on the status of equipment, supplies, or personnel.

During a typical business day, while thousands of individual print jobs are being printed and shipped to customers, thousands of new print jobs are being received. It can be appreciated that the contents of pending jobs database 101 will, therefore, be constantly changing and that it would be advantageous to delay the process of creating production gangs until just before the gang is required to increase the possibility of producing a gang with the most valuable or highest priority collection of individual print jobs. Production gangs to be supplied to the presses for printing are, therefore, created by ganger 102 at different times during the production period on an "as needed" or "just in time" basis. In general, the creation of a production gang for transmission to production queue 412 is delayed until shortly before the press line for which the gang is destined is ready to being work on the gang. As discussed above, it is desirable to produce a production gang as closely to the time of production as possible, but it is undesirable to have a press line at the printing facility become idle because the next production gang that has not yet arrived. Because the PDF file for a production gang containing many individual print jobs will typically be many megabytes in size and because of the possibility of a failure or delay in the transmission of the file between server 100 and facility 150, a margin of safety for file transfer is built into the production gang generation timing. The margin of safety time period employed could be relatively short if ganger 102 is located at facility 150 and the transfer is reliable and would typically be relatively longer if transfer of files over the internet is involved.

The printing services provider may choose to generate and forward one or more production gangs in advance of the anticipated use at the press line such that one or more production gangs should always be available at the printing facility just in case of a temporary interruption in network service or other problem at server 100 in the generation and forwarding of production gangs to the printing facility. Under normal operation, therefore, production gangs will be received ahead of the time they are actually required at the press line and at least one production gang for each press line in operation should be available at the printing facility. Production gangs awaiting distribution to their assigned press lines are maintained in production queue 412 prior to transfer to the appropriate press line.

As indicated in FIG. 4, a number of workstations (WS) 431-438 are positioned at various locations in Facility 150 corresponding to the various print job processing steps. While the representative example shown in FIG. 4 depicts a workstation for each offset process 421-425 and each digital process 431-435, it will be understood that more or fewer workstations may be employed, based on factors such as the particular types of printing and processing equipment being employed and the equipment configuration. As discussed below, these workstations are used by equipment operators at the printing facility to provide status information or flag problems to server 410 for forwarding to server 100. Based on this operator input, server 100 may cancel one or more entire gangs or remove one or more individual print jobs from a gang currently in process. The status of these individual print jobs in database 101 is changed to indicate that the job is available for ganging.

Production problems occasionally surface during the processing of the print jobs. In general, production problems can be broadly classified as (a) problems affecting only a portion of the individual print jobs in a gang and (b) problems affecting an entire gang. The former category would include situations where most of the individual print jobs in a gang are processed correctly, but one or more jobs within the gang needs to be reprinted. For example, a few individual jobs in a gang could be marred because of a localized scratch on one of the press plates or a properly printed individual print job could be damaged during the packaging process.

The latter category of problems that affect an entire gang, can be further broken down into the subcategories of (a) problems that temporarily disrupt the normal production process and that can be corrected reasonably quickly or easily at the printing facility and (b) problems that are best corrected by canceling and dissolving the entire gang and making all of the individual print jobs in that gang available again in database 101 for assignment by ganger 102 to a new gang. The former subcategory would include various production incidents such as accidental damage to a CMYK plate during installation in the press causing the production of that gang to be delayed until a replacement plate can be created or improper cutting or other damage to a printed gang that requires the gang to be reprinted. In these circumstances, the processing of that gang can be restarted or reinitiated at the appropriate step in the process as soon as the problem is identified and corrected and this type of issue can typically be handled on an ad hoc basis without significant disruption in the overall production schedule and without impacting the operation of ganger 102.

In other circumstances, however, the best option is to cancel one or more existing production gangs. For example, after one or more production gangs have been created at server 100, assigned to a specific press in the printing facility, and forwarded to production queue 412, the assigned press may experience a malfunction that halts the production process. If the malfunction can be corrected in relatively short time, processing of gangs at that press can be temporarily suspended and proceed when the press is repaired. However, if the malfunction is such that it will keep the press out of service for a prolonged period, the gangs currently assigned to that press will be cancelled and the individual print jobs in those gangs will be made available again for incorporation into another gang for another press. Releasing the individual jobs for ganging will allow high priority individual print jobs to be identified as available by ganger 102 and associated with a new gang assigned to a different press. The amount of time the printing services provider waits before canceling a gang can be established by the printing services provider based on factors such as the estimated repair time, the number of other presses available, the number of pending jobs in database 101, and the number of high priority individual print jobs in the production gang or gangs currently assigned to the inoperative press.

To meet the needs of a range of customers, a printing services provider may offer multiple different delivery options at corresponding different price points. For example, for customers requiring rapid turnaround of their product, the services provider may offer various expedited delivery times at an additional charge, such as next day delivery, second day delivery, or seven day delivery. For customers not requiring rapid delivery, the provider may offer various slower deliver times at a reduced or possibly no charge, such as 14- or 21-day delivery. A product order for which the customer has requested next day delivery will need to be produced and shipped that same day and therefore will immediately have a very high priority for ganging purposes. A product for which the customer has requested a slower delivery will initially have a relatively lower priority for ganging purposes, but, as its delivery deadline gets near, if it still has not been produced, its priority will be increased. Regardless of the delivery time requested, it is in the best interests of the printing services provider to meet that delivery commitment. Therefore, associated with each individual job in database 101 will be an associated date indicating the date by which that individual job must be shipped in order to meet the delivery date indicated to the customer.

Figure 5:
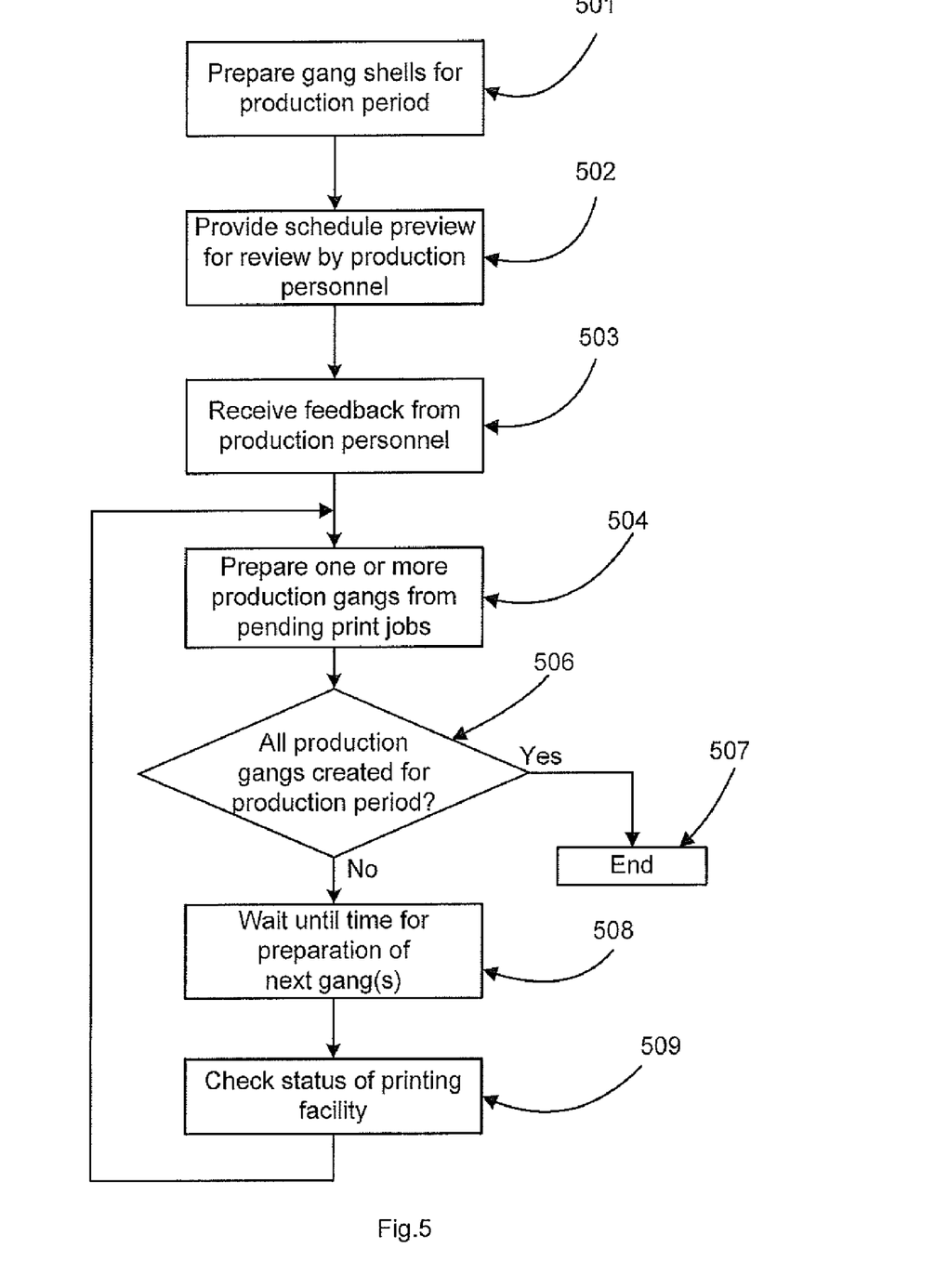
FIG. 5 is a flowchart of one embodiment the invention.

FIG. 5 presents a flow chart of an implementation of the gang scheduling and creation process. At step 501, ganger 102 searches database 101 to identify the high priority individual print jobs that need to be produced during the upcoming production period to allow the service provider to meet its delivery obligations. Based on the number and printing parameters of these high priority jobs, ganger 102 will determine the number of gangs required to produce those high priority jobs. For example, a gang of postcard jobs as illustrated in FIG. 3 can accommodate 42 individual postcard print jobs. If ganger 102 were to determine that 60 individual postcard print jobs require printing the next day, the ganger 102 would define two high priority postcard gang shells. Similarly, ganger will define the required number of gang shells for all different product types having high priority jobs that must be printed the following day.

Except under rare circumstances, the printing of the high priority gangs will not consume all printing time and capacity at facility 150. After all high priority gang shells have been defined, ganger 102 will determine how much manufacturing capacity remains and will define additional gang shells to be produced after the high priority gangs have been completed. Ganger 102 will then automatically determine the order of printing of the gangs and assign each of the individual gang shells to one of the various printing presses at facility 150. In assigning gangs to presses and determining the order of printing of the gangs, ganger 102 will, to the extent feasible, try to "batch" together gangs using the same print processing and paper stock to minimize the requirement for paper changes and other adjustments at the press. As an alternative to automatic gang ordering and press assignment at server 100, ganger 102 could be implemented to provide descriptions of the gang shells to printing personnel at facility 150 and allow those personnel to control the assignment of the gang shells to the available presses.

At step 502, a production schedule preview for the upcoming production period is made available for review by printing personnel at facility 150. As discussed above, the personnel at the print facility may be aware of issues that impact the ability of the facility to execute the production schedule as currently configured. At step 503, the production personnel review the schedule and provide any comments, recommendations, or other feedback via WS 470 to ganger 102. If the feedback is such that the planned production schedule as presented in the preview schedule cannot be met, for example due to unexpected equipment problems, ganger 102 will generate a new production schedule reflecting the updated circumstances at the printing facility.

Based on the production schedule, as updated to reflect any updates from step 503, ganger will begin the creation of the production gangs at step 504. The first productions gangs of the day will be filled with the high priority individual print jobs that the printing services provider desires to print and ship that day. Any available individual print jobs positions in the gang that are still available after all high priority jobs have been accommodated are assigned to lower priority print jobs.

While the required delivery date of an individual print job is a key factor used by ganger 102 in selecting pending print jobs for ganging, the printing services operator can employ additional factors to adjust the ganging priority of individual jobs. For example, as mentioned above, if a product is being held in a bin awaiting production of another product the ganging priority of the remaining products that have not yet been ganged can be increased. Similarly, high revenue products or products from a preferred customer can also receive higher priorities, resulting in earlier ganging and production than would otherwise have been the case.

After the individual print jobs have been assigned to the positions in the gang, the electronic documents associated with the individual print jobs are retrieved from database 101 and the gang is created. The preparation of the gang for transmission to facility 150 depends on the particular processing capabilities and requirements of the printing systems to be used for the gang. For a gang to be printed on offset press line 420, the individual print jobs are combined at server 100 into a single large electronic PDF document file for transmission to production queue 412 and then to RIP 421. For a gang to printed on digital press line 430, the individual files are transmitted to facility 150 along with a descriptor file telling digital press 431 how the individual print jobs are to be arranged in the gang. Press 431 will position the individual jobs for printing according to the descriptor file instructions.

If the day's production of gangs has not yet been completed at step 506, ganger 102 will wait at step 508 until the appropriate time to prepare the next gang. At any time during the production period, problems can arise at printing facility 150 causing equipment to become unavailable or causing scheduled gang shell to be cancelled, therefore, before creating each additional gang, the current status and status updates from facility 150 are checked at step 509 to determine if the current production schedule is still viable or if production schedules or press assignments need to be revised. After making any required schedule adjustments at step 509, the gang creation process repeats until the day's production of gangs has been completed.

While an exemplary embodiment of the invention has been discussed, the described embodiment is to be considered as illustrative rather than restrictive. The scope of the invention is as indicated in the following claims and all equivalent methods and systems.

What is claimed is:

1. An automated method for creating gang shells, the method comprising:
   retaining in electronic form a plurality of individual jobs for production at a production facility, each individual job having one or more associated production parameters;
   based at least on available production capacity at the production facility and the production parameters of the individual jobs, creating, by one or more processors, one or more gang shells defining characteristics for one or more respective production gangs of individual jobs planned to be subsequently created and produced in the future, wherein the one or more gang shells are not associated with any specific ones of the individual jobs.

2. The method of claim 1, further comprising:
   generating, by one or more processors, a schedule for future creation of one or more gangs as defined by the one or more gang shells, each gang comprising a plurality of individual job positions and containing one or more of the retained individual jobs in respective one or more of the plurality of individual job positions.

3. The method of claim 1, further comprising:
   prior to generating the schedule, prioritizing, by one or more processors, the production of at least some of the gangs defined by the gang shells based on at least the defined characteristics of the one or more gang shells.

4. The method of claim 1, further comprising:
   searching, by one or more processors, the retained plurality of individual jobs to identify one or more high priority individual jobs;
   based on the production parameters of the identified high priority individual jobs, determining, by one or more processors, a number of high priority gang shells required for the production of the identified high priority individual jobs; and
   defining, by one or more processors, the required number of high priority gang shells for the production of the identified high priority individual jobs.

5. The method of claim 4, wherein high priority individual jobs comprise retained individual jobs that must be produced in a next immediate production period.

6. The method of claim 4, further comprising:
   generating, by one or more processors, a schedule for future creation of one or more gangs as defined by the one or more high priority gang shells, each gang comprising a plurality of individual job positions and at least one of the individual job positions for containing one of the retained high priority individual jobs that match the defined characteristics of the gang shell from which it is created.

7. The method of claim 4, further comprising:
   determining, by one or more processors, any remaining available production capacity at the production facility;
   based on the remaining available production capacity at the production facility and the production parameters of any remaining retained individual jobs that were not identified as high priority individual jobs, defining, by one or more processors, one or more additional gang shells for the production of one or more of the remaining retained individual jobs.

8. The method of claim 7, further comprising:
   generating, by one or more processors, a schedule for future creation of one or more gangs as defined by the one or more high priority gang shells and one or more additional gang shells, each gang comprising a plurality of individual job positions each for containing one of the retained individual jobs that match the defined characteristics of the gang shell from which it is created, wherein the schedule specifies production of gangs associated with the high priority gang shells prior to production of gangs not associated with the high priority gang shells.

9. The method of claim 8, further comprising:
   receiving, by one or more processors, indication of a change in available production capacity; and
   based on the received indication of the change in available production capacity, generating, by one or more processors, a revised schedule for future creation of the one or more gangs.

10. The method of claim 8, wherein the schedule batches together production of gangs having similar production processing characteristics.

11. The method of claim 10, further comprising:
    generating, by one or more processors, a production schedule preview for an upcoming production period.

12. The method of claim 11, further comprising:
    receiving, by one or more processors, production schedule preview review feedback; and
    based on the received feedback, generating, by one or more processors, an updated schedule for future creation of the one or more gangs.

13. The method of claim 1, further comprising:
    based on at least the defining characteristics of the one or more gang shells, developing, by one or more processors, a schedule for future creation of one or more gangs as defined by the one or more gang shells, each gang comprising a plurality of individual job positions each for containing one of the retained individual jobs that match the defined characteristics of the gang shell from which it is created, wherein each gang shell is assigned a priority level and wherein the developing of the schedule is further based on the assigned priority levels of the gang shells.

14. The method of claim 13, wherein:
the individual job production parameters include an indication of the requested date of delivery to the customer of the produced individual job and wherein the priority level assigned to each gang shell is based on at least the earliest requested individual date of delivery of the individual jobs in the gang.

15. The method of claim 1 wherein:
the retained individual jobs include individual jobs for a plurality of different types of products and further comprising determining the types of products to be produced during a time period.

16. The method of claim 15, further comprising:
creating, by one or more processors, one or more gang shells for each type of product to be printed during the time period.

17. The method of claim 13, wherein the individual jobs are individual print jobs and further comprising:
creating, by one or more processors, the one or more gangs as defined by the one or more gang shells according to the schedule; and
for at least one of the one or more gangs: printing a desired quantity of the respective gang to create respective one or more printed copies of the respective gang, the respective gang comprising a plurality of individual print job positions and at least one individual print job contained in at least one of the individual print job positions in the respective gang; and cutting the respective one or more printed copies of the respective gang to separate the individual print jobs assigned to the respective gang.

18. A system comprising
at least one production system,
a plurality of individual jobs retained in electronic form and having one or more production parameters associated therewith,
a ganger capable of defining a plurality of gang shells based on at least the production parameters and the production capability of the at least one production system, the gang shells defining characteristics for one or more respective production gangs of individual jobs planned to be subsequently created and produced in the future, wherein the one or more gang shells are not associated with any specific ones of the individual jobs,
a scheduler capable of developing a schedule for production of at least some of the gangs represented by the gang shells, and
a ganger capable of creating gangs to be produced by the at least one production system.

19. One or more non-transitory computer readable medium having embodied thereon computer executable instructions which, when executed by at least one processor, perform the method of claim 1.

20. Non-transitory computer readable storage tangibly embodying program instructions which, when executed by a computer, implement a gang shell for characterizing_a production gang of individual jobs to be subsequently created and produced in the future, the individual jobs for production at a production facility and each having one or more associated production parameters, the program instructions comprising:
a description of a gang to be created and produced in the future, defining one or more production parameters, to which individual jobs having associated production parameters that match the defined production parameters of the gang shell may be assigned when a gang is created in the future, the gang shell not containing any specific ones of the individual jobs.

21. The non-transitory computer readable storage of claim 20, wherein the individual jobs are individual print jobs for production of an associated printed product, each individual print job having production parameters comprising at least a desired quantity of the associated printed product.

22. A system comprising
one or more processors configured to search a plurality of individual jobs retained in electronic form and having one or more production parameters associated therewith and to define a plurality of gang shells based on at least the production parameters and the production capability of at least one production system, the gang shells defining characteristics for one or more respective production gangs of individual jobs planned to be subsequently created and produced in the future, wherein the one or more gang shells are not associated with any specific ones of the individual jobs.

23. The system of claim 22, comprising
one or more processors configured to generate a schedule for future creation of one or more gangs as defined by the one or more gang shells, each gang comprising a plurality of individual job positions and containing one or more of the retained individual jobs in respective one or more of the plurality of individual job positions.

24. The system of claim 22, wherein
prior to generating the schedule, the one or more processors configured to generate the schedule prioritize the production of at least some of the gangs defined by the gang shells based on at least the defined characteristics of the one or more gang shells.

25. The system of claim 22, wherein
the one or more processors configured to search the retained plurality of individual jobs are further configured to identify one or more high priority individual jobs, determine a number of high priority gang shells required for the production of the identified high priority individual jobs based on the production parameters of the identified high priority individual jobs, and define the required number of high priority gang shells for the production of the identified high priority individual jobs.

26. The system of claim 25, wherein high priority individual jobs comprise retained individual jobs that must be produced in a next immediate production period.

27. The system of claim 25 comprising
one or more processors configured to generate a schedule for future creation of one or more gangs as defined by the one or more gang shells, each gang comprising a plurality of individual job positions and at least one of the individual job positions for containing one of the retained high priority individual jobs that match the defined characteristics of the gang shell from which it is created, 28. The system of claim 25 comprising
one or more processors configured to determine any remaining available production capacity at the production facility and to define one or more additional gang shells for the production of one or more of the remaining retained individual jobs.

29. The system of claim 28 comprising
one or more processors configured to generate a schedule for future creation of one or more gangs as defined by the one or more high priority gang shells and one or more additional gang shells, each gang comprising a plurality of individual job positions each for containing one of the retained individual jobs that match the defined characteristics of the gang shell from which it is created, wherein the schedule specifies production of gangs associated with the high priority gang shells prior to production of gangs not associated with the high priority gang shells.

30. The system of claim 29 wherein
the one or more processors configured to generate the schedule are configured to receive an indication of a change in available production capacity and to generate a revised schedule for future creation of the one or more gangs based on the received indication of the change in available production capacity.

31. The system of claim 29 wherein the schedule batches together production of gangs having similar production processing characteristics.

32. The system of claim 31 wherein
the one or more processors configured to generate the schedule are configured to generate a production schedule preview for an upcoming production period.

33. The system of claim 32, wherein
the one or more processors configured to generate the schedule are configured to receive production schedule preview review feedback and to generate an updated schedule for future creation of the one or more gangs based on the received feedback.

34. The system of claim 22 comprising
one or more processors configured to generate a schedule for future creation of one or more gangs as defined by the one or more gang shells, each gang comprising a plurality of individual job positions each for containing one of the retained individual jobs that match the defined characteristics of the gang shell from which it is created, wherein each gang shell is assigned a priority level and wherein the developing of the schedule is further based on the assigned priority levels of the gang shells.

35. The system of claim 34, wherein:
the individual job production parameters include an indication of the requested date of delivery to the customer of the produced individual job and wherein the priority level assigned to each gang shell is based on at least the earliest requested individual date of delivery of the individual jobs in the gang.

36. The system of claim 34, wherein the individual jobs are individual print jobs and the one or more processors are further configured to create the one or more gangs as defined by the one or more gang shells according to the schedule, and to send the created gangs to a production system.

37. The system of claim 36, further comprising:
a printing system which prints a desired quantity of the respective gang to create respective one or more printed copies of the respective gang, the respective gang comprising a plurality of individual print job positions and at least one individual print job contained in at least one of the individual print job positions in the respective gang, and
a cutting system which cuts the respective one or more printed copies of the respective gang to separate the individual print jobs assigned to the respective gang.

38. The system of claim 22, wherein:
the retained individual jobs include individual jobs for a plurality of different types of products and further wherein the one or more processors are further configured to define the plurality of gang shells based the types of products to be produced during a time period.

39. The system of claim 38, wherein
the one or more processors create one or more gang shells for each type of product to be printed during the time period.

* * * * *